March 16, 1965 M. T. THORSSON ETAL 3,173,504
CARD OPERATED BATCHER
Filed Sept. 13, 1955 6 Sheets-Sheet 2
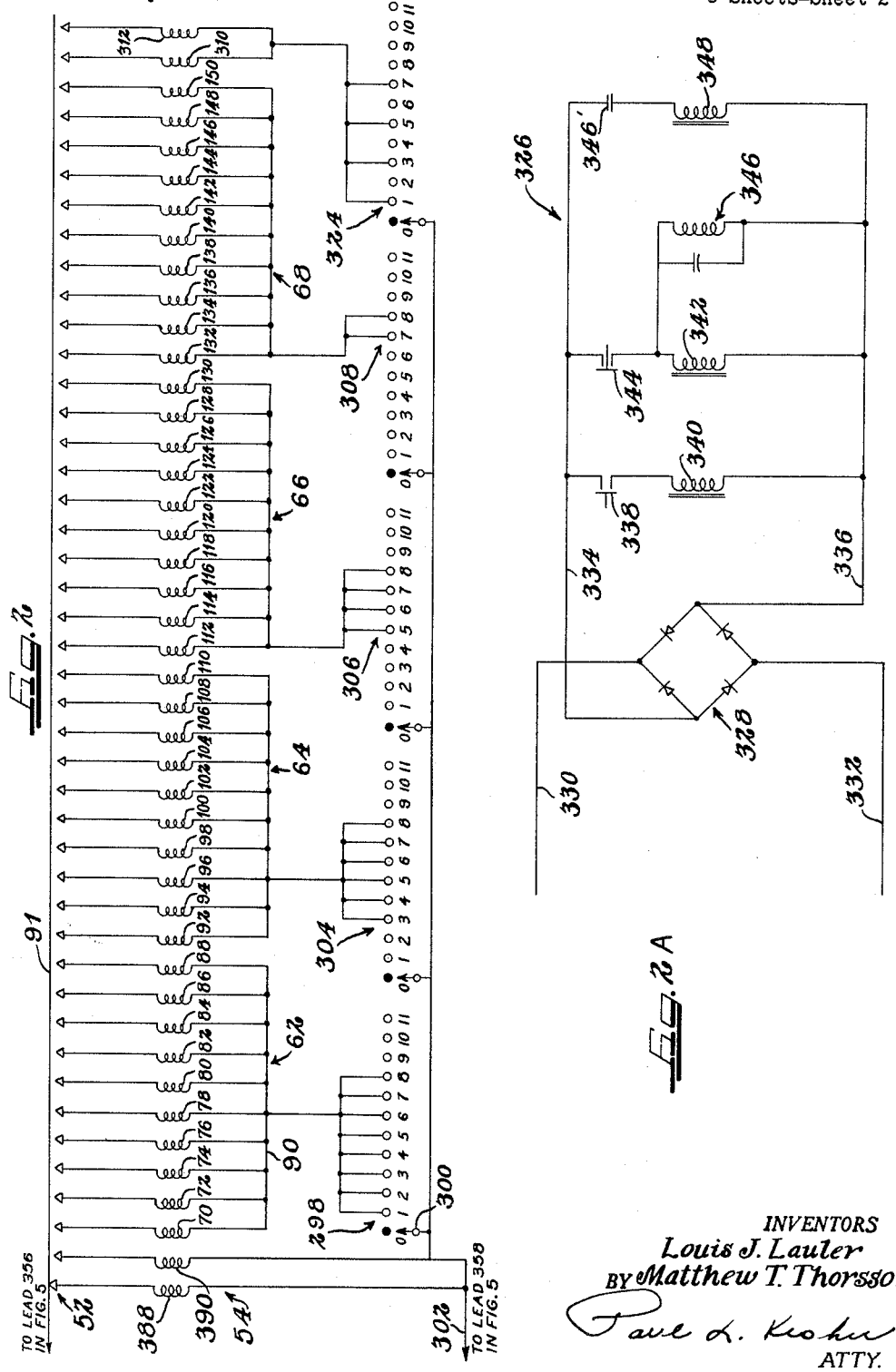
INVENTORS
Louis J. Lauler
BY Matthew T. Thorsson
Paul L. Keehn
ATTY.

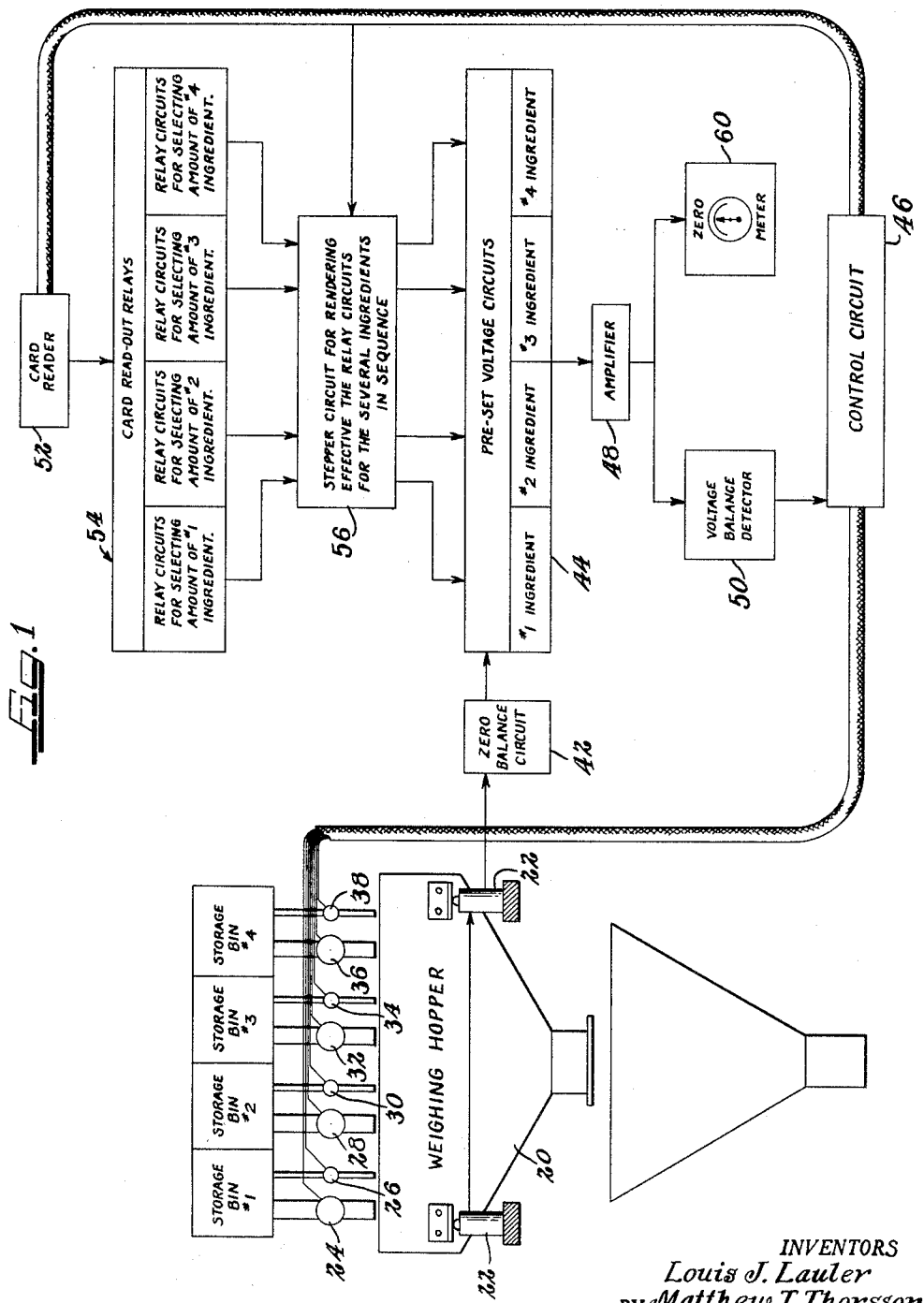

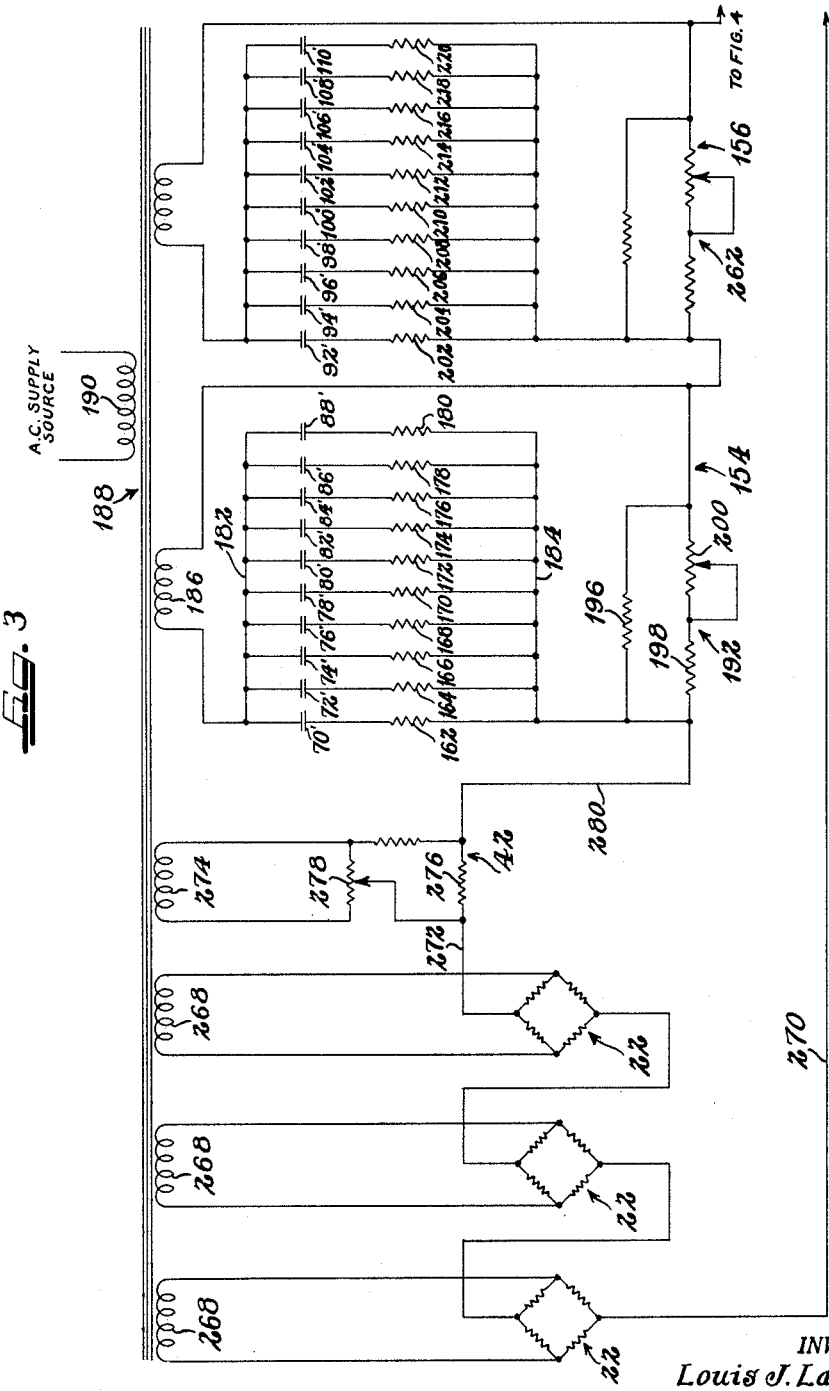

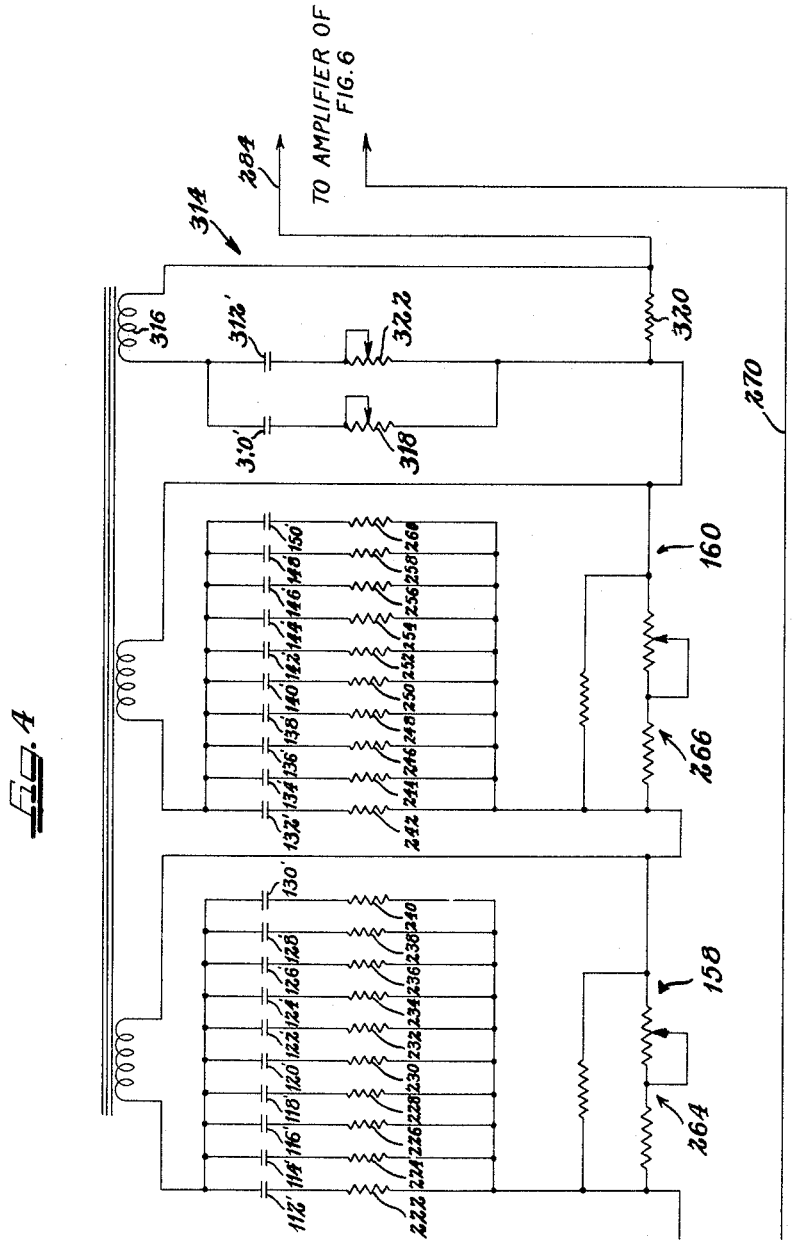

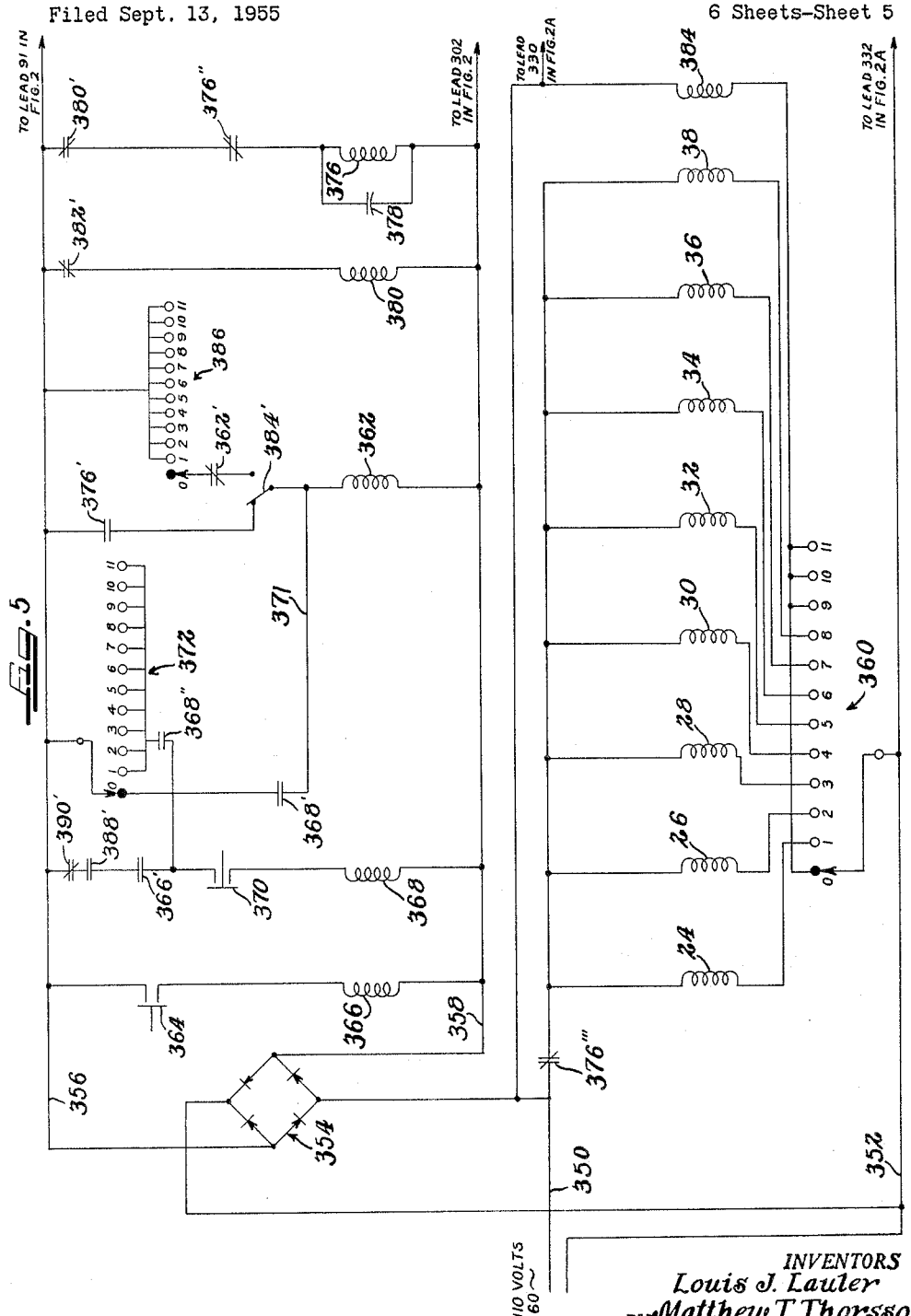

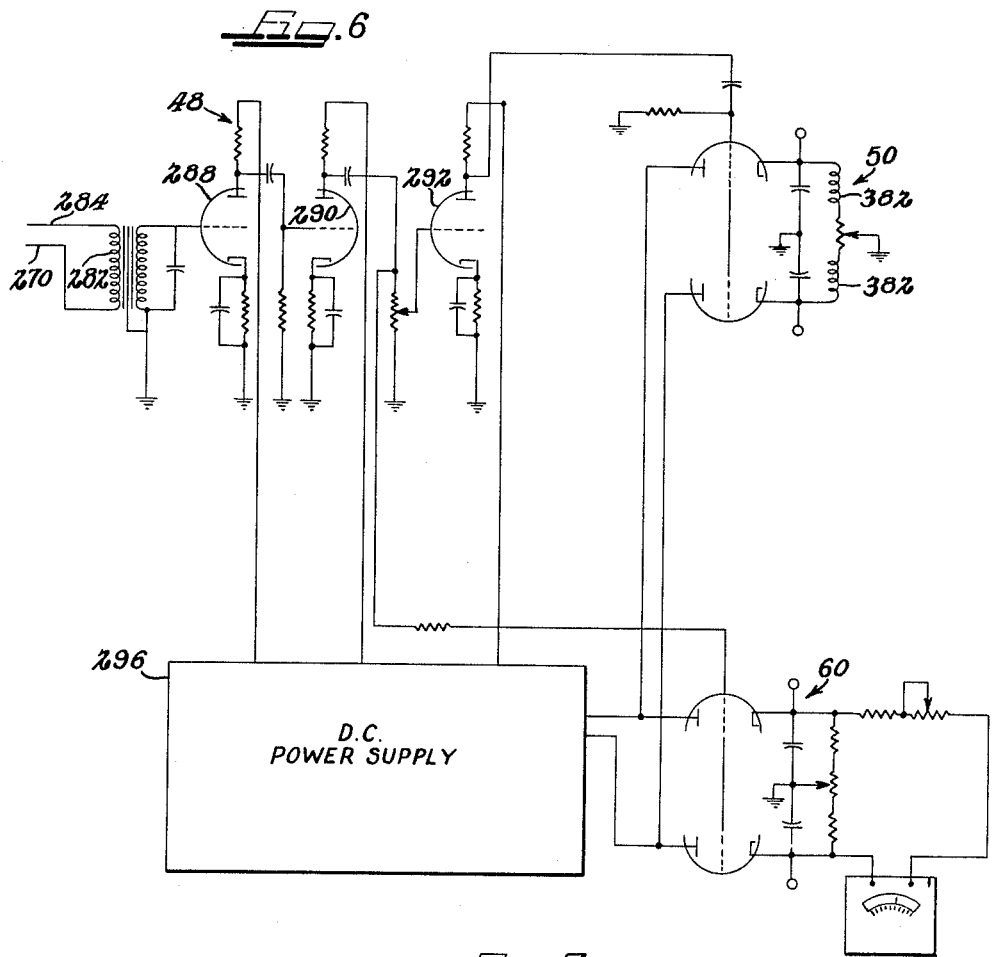

United States Patent Office 3,173,504
Patented Mar. 16, 1965

3,173,504
CARD OPERATED BATCHER
Matthew T. Thorsson, Moline, Ill., and Louis J. Lauler, Reseda, Calif., assignors, by mesne assignments, to Fairbanks Morse Inc., New York, N.Y., a corporation of Delaware
Filed Sept. 13, 1955, Ser. No. 534,134
33 Claims. (Cl. 177—70)

This invention relates to weighing systems, and more particularly relates to a card operated batch weigher of the type wherein pre-set voltage circuits control the weights of materials making up the batch.

In the batch weigher of the present invention, the operation is controlled by a perforate card, which is punched in accordance with the weight requirements of each of several ingredients. The card is placed in a card reader, which operates to energize a plurality of card read-out relays. These relays condition voltage producing circuits to produce sequentially a predetermined or pre-set voltage for each ingredient, which pre-set voltage is proportional to the weight of the ingredient that is to be present in the final batch. Thus, the card is punched to represent a certain batch formula (how much of which ingredients are to be present in the batch), and the card read-out relays sense this punched card information to produce voltages representative of the exact weight required for each ingredient. While the card used in the illustrated embodiment is of the punched or perforated type, it should be understood that the specific type of card shown is not essential to the invention and other conventional types may be used. For this reason, in the claims the card is referred to as having information "impressed" thereon, rather than being punched so as not to limit the invention unduly.

The ingredients are all delivered to a load cell supported hopper, the load cells being arranged to produce a voltage proportional to the weight of the hopper plus the weight of any material disposed in the hopper. A zero balancing circuit is provided to generate a voltage which opposes the load cell voltage to compensate for the dead load (hopper weight) so that the effective load cell voltage is zero when no material is in the hopper. Thus the effective load cell voltage will be directly proportional to the weight of any material in the hopper. The load cells are connected in series circuit arrangement with the pre-set voltage producing circuits and the input of an amplifier. The voltages produced by the pre-set voltage circuits are in phase opposition to the load cell voltage and the algebraic sum of these voltages is effective at the amplifier input. The electrical control circuit of the apparatus includes stepping switches which render banks of the card read-out relays effective in sequence, each bank representing one ingredient.

Hence, at the start of the weighing operation the stepping circuits activate the card read-out relays for the number one ingredient to set up the pre-set voltage circuit for the number one ingredient, and produce a first opposing voltage proportional to the required weight of the number one ingredient. At this time no material is in the hopper and the entire amplifier input is represented by the aforesaid first opposing voltage. The amplifier feeds as balance detector, which through the control circuit causes the material supply valve for the first ingredient to open. As the first ingredient flows into the hopper, the load cell voltage will increase until it equals the first opposing voltage, indicating that the predetermined amount of the first material is in the hopper. At this time the algebraic sum of the load cell and opposing voltages, is zero and the balance detector in response to this null voltage condition will, through stepper switches in the control circuit, cut-off the number one ingredient valve and open the number two ingredient valve. The balance detector also causes the stepper circuit controlling the pre-set voltage circuits to operate and render a second bank of card read-out relays operative. This second bank of relays operates the pre-set voltage circuit for the number two ingredient to connect a second opposing voltage in series with the load cell voltage and the first opposing voltage. Since an unbalance of voltages then exists, the balance detector holds the number two ingredient valve open. When enough of the second ingredient has been delivered to the hopper to produce a second balance of voltages, the balance detector closes the valve through which the second ingredient flows and stops feed of the second ingredient, renders a third bank of card read-out relays operative and starts feed of the number three ingredient. This sequential operation continues until all ingredients are in the hopper. At the completion of this cycle of operation, the activated circuits are deenergized in preparation for a subsequent batching operation.

Provision is made for effecting a reduced flow or dribble feed for the last few pounds of each ingredient by alternately making a dribble voltage effective and ineffective in series with the load cells and pre-set opposing voltage circuits. The dribble feed enables more accurate batch weighing. A zero balance detector and meter are provided to offer a visual indication for balancing purposes. The control card, read-out relay, and pre-set voltage circuits are arranged to utilize a novel numerical system based on a combination of the binary and decimal systems of numbers. This novel system, called the binary coded decimal system, greatly simplifies the electrical circuit arrangements and at the same time makes the control card relatively easy to punch and visually read.

Accordingly an object of this invention is to provide a batch weighing system in which the batch formula is impressed on a control card and a card reader is utilized to control the batching operation.

Another object of the invention is to provide a batch weigher having voltage circuits which are set up by a control card to produce voltages proportional to the requisite weights of the batch ingredients.

A further object is to provide a weighing system operated from a control card, which is marked in accordance with a binary coded decimal system of numbers.

A still further object is to provide a batch weighing system having pre-set voltage circuits for producing voltages representative of ingredient weights in the batch, these voltages being produced by combining voltage values represented in the system of binary numbers.

Another object of the invention is the provision of a batch weigher operated from a control card and having a card reader including banks of relays operated in accordance with the weight requirement of particular ingredients, the banks of relays being rendered operative in sequence by switching apparatus.

A further object of the invention is the provision of a batcher having a balance bridge circuit that includes a plurality of impedance elements, which, when rendered effective, each produce a voltage in the bridge circuit representative of a binary value, the output voltage of the bridge circuit being the summation of the effective, individual binary voltage values.

These and other objects and advantages will become more readily apparent as this description proceeds and is read in conjunction with the accompanying drawings in which:

FIG. 1 is a schematic layout in block form of a complete electrical batch weighing system;

FIG. 2 is the electrical diagram of the card reader;

FIG. 2A is a schematic diagram of the control circuit for the card reader;

FIG. 3 is a schematic diagram of a part of the voltage balancing circuit, including the load cells, dead load balancing circuit, and the pre-set voltage circuits for the number one and number two ingredients;

FIG. 4 is a schematic diagram of the remainder of the voltage balancing circuit, including the pre-set voltage circuits for the number three and number four ingredients and the dribble circuit;

FIG. 5 is a schematic diagram of the electrical control circuit of the batcher and is to be read in conjunction with FIGS. 2 and 2A of the drawings;

FIG. 6 is a schematic diagram of the amplifier, balance detector and zero meter circuits; and FIG. 7 is a plan view of the perforate control card for the batcher.

Referring first to FIG. 1 of the drawings, which diagrammatically shows the batch weighing system, it will be seen that a weighing hopper 20 which receives the material to be batched is supported by a plurality of load cells 22 (two of the load cells being shown in FIG. 1). The flow of material from the storage bins #1–#4 to the hopper is controlled by a main and dribble valve for each ingredient. The main and dribble valves for the number one ingredient are indicated at 24 and 26, respectively. The main valves for the other ingredients are indicated at 28, 32 and 36 while the corresponding dribble valves are indicated at 30, 34 and 38.

The load cells 22, which may be of the conventional bonded strain gauge type, are connected in series and produce an output voltage that is proportional to the load weight carried by the load cells. The load cells are connected to a zero balancing circuit 42, which is adapted to produce an adjustable voltage in phase opposition to the load cell voltage. The opposing voltage of the circuit 42 is adjusted to reduce the load cell voltage to zero when no material is in the hopper. In other words the load cell voltage produced by the dead load of the hopper is nullified so that the effective load cell voltage is proportional to the actual weight of material in the hopper. The effective load cell voltage is fed to pre-set voltage circuits, indicated at 44. Circuits 44 provide several voltages in sequence in phase opposition to the load cell voltage, one opposing voltage being supplied for each batch ingredient and the magnitude of the opposing voltage being representative of the amount of that ingredient required.

Because of the circuit arrangement of control circuit 46, the opposing voltage for the first ingredient will be the only opposing voltage that is initially effective and the supply valves 24 and 26 are the only valves capable of delivering material to hopper 20. Hence, at the start of the batching cycle no material will be in the hopper, resulting in zero load cell voltage, and the opposing voltage for the number one ingredient will be effective. This produces a voltage unbalance, which is amplified by amplifier 48 and sensed by balance detector 50 to condition control circuit 46 to open valve 24. Thus, the number one ingredient feeds into the hopper, and as the material reaches the hopper it causes the load cell voltage to increase. When the load cell voltage equals the number one opposing voltage, a balance of voltages exists and in response thereto the balance detector 50, via control circuit 46, closes valve 24. (It will be hereinafter explained how first the main and later the dribble valves are opened and closed to get a "dribble approach" cut-off of material feed.) Also upon reaching the voltage balance condition, the control circuit opens valves 28 and 30 for the number two ingredient and renders the number two opposing voltage effective so that a second voltage unbalance then prevails. Thus, the number two ingredient feeds until the load cell voltage equals the combined voltage value of the number one and number two ingredient opposing voltages, whereupon balance detector 50 causes the number two ingredient valves 28 and 30 to close, the number three ingredient valves 32 and 34 to open, and the number three ingredient voltage to be effective. Similar operation follows for the number three and number four ingredients.

As previously mentioned, for making a certain batch the magnitude of each pre-set opposing voltage must be equal to the load cell voltage produced when the desired weight of each material is in the hopper. Thus if 100 lbs. of number one ingredient is required, the number one opposing voltage is set-up equal to the load cell voltage produced by 100 lbs. in the hopper. The other voltages are selected similarly. The selection of opposing voltage magnitudes, which in turn determines the weight of each batch ingredient, is controlled from a card reader 52, which is adapted to receive a punched card 53 shown in FIG. 7 of the drawings. As it will later appear, the weight information is punched into the card and when it is placed in the card reader, the latter sets up banks of card read-out relay circuits, one bank for producing each of the pre-set opposing voltages. These banks of read-out relays, generally indicated by numeral 54 in FIG. 1, are rendered effective one at a time by stepper circuit 56 to provide sequential control of the pre-set voltages.

Also in FIG. 1 a zero meter circuit 60 is provided to afford a visual indication of the voltage condition in the voltage balancing circuit including the load cell 22, zero balancing circuit 42 and pre-set voltage circuits 44.

An important feature of the novel batch weighing system is that the control card, card read-out relays and pre-set voltage circuits are adapted to utilize a binary coded decimal system of numerical values. The binary system of numbers, which is well known to mathematicians, is based on the fact that any whole number can be represented as the sum of the numbers produced by raising two to various powers. Listed below is a partial table of numbers produced by raising two to all integral powers up to 9.

$2^0 = 1$  $\qquad$ $2^5 = 32$
$2^1 = 2$  $\qquad$ $2^6 = 64$
$2^2 = 4$  $\qquad$ $2^7 = 128$
$2^3 = 8$  $\qquad$ $2^8 = 256$
$2^4 = 16$ $\qquad$ $2^9 = 512$ It will be seen that the numbers 1 through 15 can be written as follows:

$1 = 2^0$ (1)
$2 = 2^1$ (2)
$3 = 2^1 + 2^0$ (2+1)
$4 = 2^2$ (4)
$5 = 2^2 + 2^0$ (4+1)
$6 = 2^2 + 2^1$ (4+2)
$7 = 2^2 + 2^1 + 2^0$ (4+2+1)
$8 = 2^3$ (8)
$9 = 2^3 + 2^0$ (8+1)
$10 = 2^3 + 2^1$ (8+2)
$11 = 2^3 + 2^1 + 2^0$ (8+2+1)
$12 = 2^3 + 2^2$ (8+4)
$13 = 2^3 + 2^2 + 2^0$ (8+4+1)
$14 = 2^3 + 2^2 + 2^1$ (8+4+2)
$15 = 2^3 + 2^2 + 2^1 + 2^0$ (8+4+2+1)

When it is desired to electrically express a number, the binary system is far simpler to use than the decimal system. For example, in order to produce a practical system where voltages are created to represent all digits up to 15 when decimal voltages are used, 15 separate voltages would be required. When binary numbers are used, only 4 separate voltages are required ($2^0$, $2^1$, $2^2$, $2^3$) to represent all digits up to 15. For numbers larger than 15, the number of binary voltages required is proportionally smaller than decimal voltages.

The principal drawback to the use of binary number notation is the fact that it is unfamiliar and difficult for the average person to read or interpret numbers expressed in binary terms. With the binary coded decimal system now to be described, the difficulty of interpretation is overcome while at the same time circuit simplifications are possible because of use of the binary system. More specifically, the binary coded decimal system permits an unskilled operator to punch the card with binary coded decimal weight information, and the use of binary information greatly simplifies the card reading circuits and pre-set voltage producing circuits operated by the card reader.

By the term binary coded decimal system, it is meant that decimal denominations are used (that is tenths, units, tens, hundreds, etc.), but in each denomination binary number notation is used. Thus, in the units denomination the binary numbers 1, 2, 4 and 8 are used to express any number of units, and the units numbers 1, 2, 3, 4, 5, 6, 7, 8 and 9 are represented, respectively, by binary combinations 1, 2, 2+1, 4, 4+1, 4+2, 4+2+1, 8, 8+1. Exactly the same relationship applies in the tens denominations, except that the binary numbers 10, 20, 40 and 80 are used. In the tenths denomination binary numbers .1, .2, .4, and .8 are used. Hence the decimal number 39.7 would be represented by using binary numbers 10+20 in the tens place, binary numbers 8+1 in the units place and binary numbers .4+.2+.1 in the tenths place.

In order to illustrate how the binary coded decimal system makes it simple to punch weight information onto the control cards, attention is invited to FIG. 7 of the drawings, which shows the batcher control card 53. The batcher of the present application is adapted to weigh four ingredients and thus four horizontal rows of numbers are provided, one for each ingredient. These horizontal rows are divided into tens, units and tenths columns, as indicated. In the tens column it will be noted that binary numbers 4, 2 and 1 are provided in each horizontal row. Binary numbers 8, 4, 2 and 1 are provided in the units column, while 8, 4 and 2 are provided in the tenths column. To simplify the subsequent discussion, a maximum of 79.8 pounds of any ingredient and an accuracy of .1 pound may be achieved with the illustrated card.

Assume by way of example (and this example will be used throughout this specification) that a batch of material is to be produced having 21.6 lbs. of #1 ingredient, 79.8 lbs. of the #2 ingredient, 1.3 lbs. of #3 ingredient, and 56.4 lbs. of #4 ingredient. Each number on card 53 that is circled would be punched out to prepare the card for operation in the batcher. Thus for 21.6 lbs. of #1 ingredient, the 2 is punched out in the tens column, the 1 is punched out in the units column and the 4 and 2 are punched out in the tenths column, all in the first horizontal row. Similarly the second row is punched with a weight of 79.8 pounds. 1.3 pounds of third ingredient is to be delivered in the final batch. No number one is found in the tenths column, since the weighing system illustrated herein is not arranged to weigh with an accuracy of less than one tenth of a pound. Hence only numbers 2, 4 and 8 are given in the tenths place and in punching the card, the weight must be rounded off to the nearest even number of tenths of a pound. In the case of 1.3 lbs. the card has been punched to represent 1.2 lbs. The numbers in the fourth row are circled to represent 56.4 lbs. of the fourth ingredient.

After the weight information has been punched into the card to determine the batch formula, the card is inserted in card reader 52 (of FIG. 1), which operates the card read out relays, indicated at 54. The card reader and read out relays are schematically shown on FIG. 2, and the electrical control circuit for the card reader is shown in FIG. 2A. The card read out relays are divided into four banks of relays, one for each of the four ingredients. Each bank of relays contains 10 relays. The bank at the left, generally indicated by numeral 62, is for the #1 ingredient, while banks of relays 64, 66 and 68 are for ingredients #2, #3 and #4, respectively. Considering first relay bank 62, it will be seen that the ten tens relay coils are numbered 70, 72, 74, 76, 78, 80, 82, 84, 86, and 88. The lower ends of these relay coils are connected together by lead 90, and this lead is connected to certain of the fixed contacts of a rotary switch as to be hereinafter described. The upper end of each relay coil is connected to a movable contact of the card reader 52. These movable contacts in the inoperative condition of the card reader are spaced from a voltage supply lead or strip 91. The control card 53 is adapted to be inserted between the strip 91 and the movable contacts. It should be appreciated that when the card is properly positioned in the card reader the top horizontal row of numbers on card 53, representing the #1 ingredient, will be aligned with the row of movable contacts associated with relay bank 62. Not only is the top row of numbers aligned with these contacts, but each of the 10 movable contacts is centered on one of the ten numbers that make up the top horizontal row on the card. Thus the contacts connected to relays 70, 72 and 74 are centered over numbers 4, 2 and 1 in the tens column of the first row. The other movable contacts are similarly aligned with the numbers in the units and tenths columns of the first row.

With the card in place and when the card reader is actuated (hereinafter explained) the movable contacts will be moved toward conductor strip 91. For each number that has been punched out of the top row on the card, the associated movable contact will pass through the card and touch strip 91 to complete an electrical circuit for the energization of its associated coil. If a number has not been punched from the card the associated contact is prevented from engaging strip 91. Thus, each movable contact that engages strip 91 causes its associated relay coil to be energized. Using the example weight for the #1 ingredient indicated by circling the numbers on card 53, it will be seen that relay 72 will be energized, since the 2 is punched out of the tens column, relay 82 will be energized to represent the 1 in the units place, and relays 86 and 88 will be energized since the 4 and 2 in the tenths place are punched out.

In relay bank 64, which corresponds to the #2 ingredient, the relays are similarly connected. Relay coils 92, 94, 96, 98, 100, 102, 104, 106, 108 and 110 have movable contacts that are centered respectively over numbers 4, 2 and 1 in the tens columns, 8, 4, 2 and 1 in the units column and 8, 4 and 2 in the tenths column, when the control card is properly positioned in the card reader. Thus, to use the example of 79.8 lbs. of #2 ingredient, relay coils 92, 94, 96, 98, 104 and 106 will be energized in relay bank 64 when the card reader is operated. Relay banks 66 and 68 are arranged identically to banks 62 and 64, and the relay coils in banks 66 and 68 are indicated by all the even numbers from 112 through 150. When, for example, a weight of 1.3 lbs. is used for ingredient #3, relay coils 124, and 130 will be energized upon card reader operation. For a weight of 56.4 lbs. of #4 ingredient, relay coils 132, 136, 140, 142 and 148 will be energized.

The contacts for the several card read out relays are arranged in the pre-set voltage circuits 44 (FIG. 1). A schematic diagram of the pre-set voltage circuits is shown in FIGS. 3 and 4, wihch are to be read together. There are four separate pre-set voltage circuits, one for each ingredient. The pre-set voltage circuit for the #1 ingredient is generally indicated at 154 in FIG. 3, while the #2, #3 and #4 ingredient pre-set voltage circuits are indicated by numbers 156 (FIG. 3), 158 (FIG. 4) and 160 (FIG. 4), respectively. Referring to FIG. 3 and to the #1 ingredient pre-set voltage circuit 154, it should be noted that relay contacts for the #1 ingredient relays of relay bank 62 (FIG. 2) are indicated in circuit 154 by adding a prime to the relay numbers. Likewise the relay contacts of the #2, #3 and #4 ingredient relay banks 64, 66 and 68 are arranged in the #2, #3 and #4 ingredient pre-set voltage circuits 156, 158 and 160, and the contacts are numbered by adding a prime to the operating relay indicating numbers.

Considering first the #1 ingredient pre-set voltage circuit 154, it will be noted that contacts 70′ through 88′ are each connected in series with a resistor, the resistors being indicated by the even numbers from 162 through 180. All of the series connected relay contacts and resistors are connected in parallel by leads 182 and 184. Lead 182 is connected to a transformer secondary winding 186 of transformer 188, having primary winding 190 connected to an A.C. power supply source (not shown). A plurality of resistors, generally designated at 192, are connected in series with winding 186 and the parallel combination of the relay contacts and resistors. Thus, when all of the relay contacts in the #1 ingredient pre-set voltage circuit 154 are open no current flow exists through resistor combination 192, which is made up of resistors 196 and 198 and potentiometer 200. When one or more of the relay contacts are closed, a complete circuit will be made so transformer secondary winding 186 causes current flow through resistor combination 192 to produce a voltage drop thereacross. The magnitude of this voltage drop is determined by the valve of the parallel combination of the particular ones of resistors 162 through 180 which are rendered effective by closing the relay contacts associated therewith.

The resistance values of resistors 162 through 180 are selected so that the voltage drops across combination 192 bear the same binary relationship to each other as the binary numbers on the control cards. In other words when only relay contacts 70′ are closed, resistor 162 has a resistance of such value that it will cause a voltage drop across combination 192 representative of 40 lbs. When only relay contacts 72′ are closed, resistor 164 has a resistance value which will produce a voltage drop across combination 192 representative of 20 lbs. The table below shows the representative voltage drop across combination 192 when no other relay contacts but the one indicated are closed.

| Relay contacts closed | Voltage produced across combination 192 (represented in pounds) |
| --- | --- |
| 70′ | 40 |
| 72′ | 20 |
| 74′ | 10 |
| 76′ | 8 |
| 78′ | 4 |
| 80′ | 2 |
| 82′ | 1 |
| 84′ | .8 |
| 86′ | .4 |
| 88′ | .2 |

Also the values of resistors 162 through 180 are chosen so that if more than one set of relay contacts is closed the total voltage drop across combination 192 will be representative of the combined weight values represented by each of the relay contacts when closed separately. In other words when relay contacts 70′ are closed (to produce a voltage drop representative of 40 lbs.) and contacts 72′ are closed (to produce a voltage drop representative of 20 lbs.) the total voltage drop across combination 192 will be representative of 60 lbs. (40 lbs.+20 lbs.) As another example when contacts 78′ and 86′ are closed the total voltage drop across combination 192 represents 4.4 lbs. (4 lbs. for relay contacts 78′ plus .4 lbs. for relay contacts 86′). To use the example weight of 21.6 lbs. for ingredient #1, which is indicated on card 53 in FIG. 7, is will be remembered that relays 72, 82, 86 and 88 were energized by card reader operation. Hence, relay contacts 72′, 82′, 86′, and 88′ will close to render resistors 164, 174, 178 and 180 effective in controlling the voltage drop across combination 192 to produce a voltage representative of 21.6 pounds.

Resistors having values identical to those of the resistors in the #1 ingredient pre-set voltage circuit 154 are also provided in the #2, #3 and #4 ingredient pre-set voltage circuits. These resistors are indicated by the even numbers between 202 and 220 and are shown in FIG. 3 for the #2 ingredient pre-set voltage circuit 156. In the #3 ingredient pre-set voltage circuit 158 (FIG. 4) resistors 222 through 240 are provided, as are resistors 242 through 260 for the #4 ingredient pre-set voltage circuit 160.

Resistor combinations indicated at 262, 264, and 266 are provided for the #2, #3, and #4 ingredient pre-set voltage circuits. Since the pre-set voltage circuits are identical in structure and function, no detailed explanation is needed for pre-set voltage circuits 154, 158 and 160. However, it will be indicated which of the resistors are effective for the sample batch formula used throughout this specification. As hereinbefore explained 79.8 lbs. of #2 ingredient 104 and 106 to close relay contacts 92′, 94′, 96′, 98′, dient causes energization of relay coils 92, 94, 96, 98, 104′, and 106′ in the #2 ingredient pre-set voltage circuit 156. This produces a voltage drop across resistor combination 262 representative of 79.8 lbs. For 1.3 lbs. of #3 ingredient, relays 124 and 130 will close contacts 124′ and 130′ to connect resistors 234 and 240 in pre-set voltage circuit 158. A requirement of 56.4 lbs of #4 ingredient causes resistors 242, 246, 250, 252 and 258 to be rendered effective in producing the requisite voltage drop across resistor combination 266 in pre-set voltage circuit 160.

The voltage drops produced across resistor combinations 192, 262, 264 and 266 are the opposing voltages, hereinbefore described, for determining the amounts of the #1, #2, #3 and #4 ingredients. The opposing voltages are connected so as to be in phase opposition with any load cell voltage. It will be seen from FIG. 3 that the load cells 22 (schematically indicated) are connected in series and each is energized from the secondary winding 268 of transformer 188. The load cells support the weighing hopper, and produce a resultant output voltage between leads 270 and 272 which is proportional to the gross weight carried by the load cells (gross meaning the weight of the hopper plus the weight of whatever load it contains). The zero balancing circuit 42 (FIGS. 1 and 3) is connected to the load cells and has a supply winding 274 on transformer 188. In circuit 42 a voltage is produced across resistor 276 which is in phase opposition to any load cell voltage produced by stressing the load cells. The magnitude of this opposing voltage is mainly controlled by rheostat 278. In operating the system, rheostat 278 is adjusted to a position which just balances the load cell voltage, when no load is in the weighing hopper, and the opposing voltage is produced across resistor 276. Thus, only a load cell voltage proportional to actual load in the hopper will appear between lead 270 and lead 280 after the zero balancing compensation has been made.

The resistor combinations 192, 262, 264 and 266 of the pre-set voltage circuits are connected in series between leads 270 and 280, as well as being in series with an amplifier input 282 shown in FIG. 6. It will be noted that lead 270 and lead 284 at the right hand side of FIG. 4 are arranged to connect with the amplifier input. With this arrangement of load cells and pre-set voltage circuits only the algebraic summation of the load cell voltage, opposing voltage of the zero balance circuit 42, and the opposing voltages created by the pre-set voltage circuits, which latter voltages are representative of the weight of each ingredient in the batch, is effective at the amplifier input.

The amplifier 48, which functions to amplify the resultant voltage produced by the load cells, and pre-set voltage circuits, is of conventional design and is shown in FIG. 6 of the drawing. Amplifier 48 includes three stages indicated by vacuum tubes 288, 290 and 292. A D.C. power supply 296 is provided in the conventional manner to provide suitable operating condition for the amplifier stages. The amplifier 48 serves to supply signal voltages for the balance detector 50 and zero meter circuit 60. The function of each of these latter circuits will be hereinafter described in detail, but for the present it need only be noted that when the voltages from the load cells and pre-set voltage circuits are in balance so that the input signal to the amplifier is zero, the balance detector is rendered effective to operate a relay 382.

The opposing voltages, which are representative of the ingredient weights, are rendered effective in sequence in opposing any load cell voltage. The apparatus and circuits for sequentially rendering effective the opposing voltages of pre-set voltage circuits 154, 156, 158 and 160 will now be described. When all of the relay contacts for each pre-set voltage circuit are open no opposing voltage will be created therein. As previously explained the aforesaid relay contacts are controlled by the relay coils in the banks of card reading relays, and each of the relay banks 62, 64, 66 and 68 represent one of the four ingredients. Hence, the control of the pre-set voltage circuits can be achieved by controlling operation of the relay banks, and this method of control is used in this invention.

Referring to FIG. 2 and more particularly to relay bank 62, which is used to control the flow of the #1 ingredient, it will be seen that the lead 90, which connects together the lower ends of all the relay coils, is connected to fixed contacts of a stepping type switch 298. Stepping switch 298 has a movable wiper blade or contact 300, which is adapted to engage the fixed contacts one at a time. Wiper contact 300 is connected to a D.C. supply lead 302 and the other side of this D.C. supply is connected to strip 91, against which the contacts of the card-reader relays are moved.

It will be seen that the stepping switch 298 has twelve fixed contacts numbered from 0 through 11, and the movable wiper 300 can be positioned in any of its twelve positions. The relays of bank 62 are connected to fixed contacts number 1 through 8. Hence whenever wiper 300 is in positions 1 through 8 the relays of bank 62 are capable of being energized if the control card is punched to permit their energization. Stepping switches 304, 306 and 308 are provided for the #2, #3 and #4 ingredient relay banks respectively, all of these stepping switches being identical to stepping switch 300. However, different groups of fixed contacts for each of these other switches are connected to the relays of the associated relay bank. Contacts 3 through 8 of switch 304 are connected to the relays of bank 64, while contacts 5 through 8 of switch 306 are connected to the relays of the #3 ingredient bank 66. Only fixed contacts 7 and 8 of switch 308 are connected to the relays of bank 68. Stepping switches 298, 304, 306 and 308 are mechanically connected so that the movable contacts of all the switches move together. As will be hereinafter described these several rows of contacts are each contact wafers on a stepping type relay of the class generally used in telephone stepping circuits. The function of stepping switches 298, 304, 306 and 308 is to sequentially render effective the opposing voltages, which represent the ingredient weights. Thus, it will be noted that in its number 1 position, wiper 300 of switch 298 renders the relays of bank 62 capable of being energized. The relays of banks 64, 66 and 68 cannot be energized at this time, since switches 304, 306 and 308 create an open circuit condition. Thus, in the number one position of the ganged switches only the card reading relays for the #1 ingredient are effective and this in turn causes only the #1 ingredient pre-set voltage circuit 154 (FIG. 3) to produce an opposing voltage of an amount equal to the weight punched out on card 53. For reasons to be explained, in the number 2 positions of the switches, only relay bank 62 can be operative. In the number 3 position of the switch blades, the #2 ingredient relay bank 64 is also energized as well as the #1 ingredient relay bank 62, and the same condition prevails in the number 4 position of the switches. In their number 5 positions the wiper contacts also prepare #3 ingredient relay bank 66 for energization as well as keeping the #1 and #2 ingredient banks in their energized condition. The same condition prevails when the movable wipers are in their number 6 positions. In the number 7 and 8 positions of the wipers all of the relay banks are prepared for energization. The manner in which stepping switches 298, 304, 306 and 308 are operated will later appear.

At the right hand end of card reader 52 of FIG. 2 it will be noted that a pair of card reader relays 310 and 312 are provided. These relays cooperate with the dribble column of control card 53 of FIG. 7 to determine how much, if any, of the total weight of the ingredients will be delivered to the weighing hopper at the slow, dribble rate. Relays 310 and 312 have contacts 310' and 312' in a dribble voltage circuit, generally indicated at 314 in FIG. 4. Contacts 310' are connected in series with a transformer secondary 316, potentiometer 318 and fixed resistor 320, while relay contacts 312' are connected in series with a potentiometer 322, the potentiometer 322 and relay contacts 312' being in parallel with relay contacts 310' and potentiometer 318. Thus, the voltage drop produced across resistor 320 is determined by which of the relay contacts 310' or 312' are effective to connect one or the other or both of the potentiometers 318 and 322 in circuit. Also the voltage drop is determined by the adjusted effective resistance value of potentiometers 318 and 322. The magnitude of the voltage drop across resistor 320 determines the number of pounds of the ingredients which will be delivered to the weighing hopper at the dribble rate, and with the arrangement of card reader relays 310 and 312 three different dribble amounts are possible. When the number 1 in the dribble column of card 53 (FIG. 7) is punched out, relay coil 312 will be energized upon card reader operation to close contacts 312' and connect resistor 322 in circuit. The amount of dribble voltage, and hence the number of pounds of each ingredient that will be delivered at the dribble rate, is controlled by the effective resistance value of potentiometer 322. When the number 2 is punched out of the dribble column, relay coil 310 will be energized to connect potentiometer 318 in the dribble voltage circuit 314 and produce a dribble voltage, the value of which depends on the effective resistance of potentiometer 318. The third dribble voltage is achieved by punching out both numbers 1 and 2 on the card, whereby both potentiometers 318 and 322 are effective. When neither of the numbers in the dribble column are punched no dribble voltage is produced in circuit 314.

For purposes to appear later, the dribble voltage is alternately rendered effective and ineffective in the series voltage balancing circuit comprising the load cells and pre-set voltage circuits. This is achieved by connecting the lower ends of relay coil 310 and 312 (FIG. 2) to alternate fixed contacts on a stepping switch 324. These relay coils are connected to fixed contacts number 1, 3, 5 and 7 so that they can only be energized when the movable contact of switch 324 is in these positions, and the relay coils cannot be energized when the movable contact is in any of its other positions. The movable contact of switch 324 is mechanically connected to and moves with the wiper contacts of the other stepping switches for controlling energization of the card and read out relays.

The electrical control circuit for the card reader 52 which is illustrated in FIGURE 2A will now be described. A bridge type rectifier circuit 328 is connected between A.C. supply leads 330 and 332 so as to provide a D.C. voltage between conductors 334 and 336, which are connected to the output terminals of the rectifier circuit. A normally open card hold switch 338 and a card reader contact moving relay coil 340 are connected in series between the D.C. leads. When switch 338 is pushed to its closed position, coil 340 is energized to move the card reading contacts at the top of FIG. 2 through the card holes toward strip 91. The mechanical apparatus for moving the contacts forms no part of the present invention and is not shown in the drawings. It need only be appreciated that energizing coil 340 moves all of the contacts simultaneously. When the coil 340 has completed movement of the contacts, a mechanical latch (not shown in the drawings) engages the contact moving mechanism to hold the contacts in their closed positions against the card or the terminal strip 91. The contacts are resiliently urged away from the card and terminal strip, but the latch prevents movement in this direction. A solenoid release for the latch is provided in coil 342, the energization of which is controlled by normally open push button 344. Therefore to move the card reader contacts away from the control card and terminal strip 91, it is only necessary to momentarily operate push button 344, and the contacts spring back to their open positions.

In order to release the control card from the card holder, a time delay relay coil arrangement 346 is provided in parallel with latch release coil 342. The contacts 346′ of this relay are connected in series with a card release solenoid 348 which when energized allows the control card to fall out of the card holder. Upon operation of push button 344, latch release coil 342 releases the latch to return the movable card reader contacts out of engagement with the card. At the same time relay coil 346 is energized to close contacts 346′ and operate the card release solenoid 348. Even though card release button 344 is only momentarily closed, time delay relay 346 will not immediately reoperate to open contacts 346′ due to the time delay character of the relay. Therefore, coil 348 will stay energized at least long enough to let the card fall free of the card reader.

The control circuit, indicated in FIG. 1 by number 46, for operating the stepping switches and main and dribble ingredient feed valves will now be explained. Referring to FIG. 5, which shows the entire control circuit except for the card reader control circuit 326 shown on FIG. 2a, it will be noted that a pair of A.C. supply lines 350 and 352 are connected to a bridge type rectifier 354, the D.C. output of which appears between leads 356 and 358. (It should be noted that leads 356 and 358 are connected to leads 91 and 302 of FIG. 2 respectively.) Lead 350 is connected over a normally closed contact 376′″ to the upper ends of all the main and dribble valve solenoids for the four ingredients. The main valve solenoids for the #1, #2, #3 and #4 ingredients are indicated by numbers 24, 28, 32 and 36 respectively, in both FIGS. 1 and 5. Also the #1, #2, #3 and #4 ingredient dribble valve solenoids are numbered 26, 30, 34 and 38 in these figures. It will be seen that the lower end of each main and dribble valve solenoid is connected to a separate fixed contact of another stepping type switch 360, and the movable contact or wiper of switch 360 is connected to lead 352. Stepping switch 360 controls operation of the main and dribble feeds as hereinafter described. When the wiper of switch 360 is in its number 1 position, only the #1 main feed valve will be energized so that flow of the #1 ingredient at the fast rate occurs. When the wiper moves to the number 2 position only the #1 dribble valve is operated. Likewise in the number 3 position only #2 ingredient main feed is actuated and in the number 4 position dribble feed of the #2 ingredient occurs. Thus the main and dribble feed of each ingredient alternately occurs as the stepping switch advances.

Stepping switch 360 and all of the other stepping switches in FIGS. 2 and 5 are operated from the same driver and all operate simultaneously. In other words all of the wipers move together and are at all times disposed in the same positions on their respective sets of fixed contacts. The movement of the wipers from one position to the next is effected by means of stepping coil 362 (top half of FIG. 5). Stepping coil 362 and the associated stepping switches are of conventional construction and are similar to the stepping type relays with multiple banks of contacts and wipers that are used in telephone circuits and the like. It is only necessary for the present disclosure to appreciate that each time stepping coil 362 is energized the wipers of the stepping switches will move from the positions they occupied at the time the stepping coil was energized to the next higher numbered positions. A start button 364 is provided in series with relay coil 366 between leads 356 and 358. When the start button 364 is depressed, coil 366 is energized to close contacts 366′ in series with a relay coil 368, and a normally closed stop button 370. As will be hereinafter explained, coil 368 will be energized by closure of contacts 366′ when the control card has been properly placed in the card reader. The contacts 368′ are closed when coil 368 is energized to complete a circuit to the stepping coil 362 over lead 371 and through a stepping switch 372, when the wiper for this stepping switch is in its number zero position, as shown in FIG. 5. After each complete batching operation the stepping switches are all returned to their number zero positions, in a manner to be described later, and for the purposes of this description it will be assumed that the switches are in their number zero positions at the beginning of the operation. Thus, a circuit is completed to stepping coil 362 to energize the coil and step all of the stepping switches from their number zero positions to their number 1 positions. As soon as the wiper of stepping switch 372 leaves the number zero contact and reaches the number 1 contact, the circuit to stepping coil 362 is broken, since only the number zero fixed contact is connected to coil 362 by means of contacts 368′. Thus only a single pulse is applied to coil 362 to step the wipers to their number 1 positions, and the stepping coil is then capable of being energized only through another circuit path. A second set of contacts 368″ are provided on relay coil 368, and these contacts are connected to contacts 1 through 11 of stepping switch 372. It will be seen in FIG. 5 that relay coil 368, stop switch 370 and contacts 368″ are connected in series so that a circuit will be completed for coil 368 whenever the wiper of stepping switch 372 is in any position other than the zero position. This establishes a holding circuit for coil 368, which is only broken when switch 372 is returned to its zero position. From the foregoing it should be understood that switch 372 and contacts 368′ cooperate to supply a pulse to stepping coil 362 so that the stepping switches move from their rest or stop positions into operative positions, and then a holding circuit is formed by switch 372 and contacts 368″ around contact 366′ so that coil 368 remains energized even after start button 364 is released. For this reason start button 364 need not be held down, but can be momentarily depressed to start operation.

After the stepping switches leave the number zero positions, the stepping relay coil 362 can be energized to operate the stepping switches by means of normally open contacts 376′ of times delay relay coil 376, which is paralleled by the time delay condenser 378. Coil 376 is energized through normally closed contacts 380′ of relay coil 380, and through normally closed contacts 376″. Relay coil 380 has its energization controlled by the balance detector contacts 382′. The operating coils for contacts 382′ are shown in the balance detector 50 of FIG. 6. Contacts 382′ are constructed and arranged to open when a voltage balance condition prevails between the load cell and pre-set voltage circuits, and to be closed at all times when an unbalance of voltages exists. For the present it must be understood that after the required weight of an ingredient has been delivered to the hopper a voltage balance condition exists. The balance detector senses this and causes contacts 382′ to open. Thus with contacts 382′ open, coil 380 is deenergized to close contacts 380′, which cause relay coil 376 to be fully energized over an obvious circuit after a time delay. This closes contacts 376′ in series with the stepping coil to energize the same and operate all of the stepping switches. Also when coil 376 is fully energized contacts 376″ are opened to interrupt the circuit to coil 376 and open contact 376'. Contacts 376" are provided so that the control circuit will cause the stepping switches to step past any position where none of a particular ingredient is required in the batch. When the stepping switches render effective one of the pre-set voltage circuits for which zero pounds of the ingredient are required, after a previous voltage balance of another ingredient, a balanced voltage condition immediately prevails and balance detector contacts 382' remain open and coil 376 remains energized so that coil 362 does not have a chance to deenergize. Since coil 362 has not deenergized, the stepping switches will not operate to step to the next positions and the system would stop operation. By providing contacts 376" the coil 376 is automatically deenergized after a time delay so that the stepping coil is deenergized.

After a balance of voltages is achieved between the load cells and pre-set voltage circuits to indicate that the required amount of an ingredient has been delivered to the hopper, the valve solenoid for that ingredient must be immediately deenergized. For this purpose it will be seen that relay coil 376 has normally closed contacts 376''' connected in series between the supply line and the plurality of valve solenoids. Thus, whenever coil 376 is energized to indicate a voltage balance, contacts 376''' open to cut off any material feed. Also this arrangement prevents any inadvertent material feed that might be caused while stepping switch 360 is moving from one position to the next.

After all of the ingredients are delivered to the hopper, a homing circuit operates to place the system in condition to weigh another batch. In the system illustrated in the drawings, positions 1 through 8 of the stepping switches are in use during the voltage balancing operation and the zero positions are the rest or stop positions. Referring to the lower right hand corner of FIG. 5, it will be seen that a relay coil 384 is connected to the number 9, 10, 11 and zero fixed contacts of stepping switch 360. When a balanced voltage condition is reached with the stepping switches in the number 8 positions (in the number eight positions the dribble feed for the #4 ingredient is accomplished) the switches are stepped to their number 9 positions and relay coil 384 is energized. The relay contacts 384' are so connected to stepping coil 362 that a circuit to this coil through contacts 376' is opened and at the same time a circuit to the coil through stepping switch 386 is closed, when coil 384 is energized. All of the contacts of switch 386, except the number zero contact, are connected to one side of the line, and the wiper has normally closed contacts 362' connected in series therewith. Contacts 362' are arranged to open each time stepping coil 362 is energized. Thus when coil 384 is energized to connect stepping coil 362 in circuit with switch 386, the stepping coil will be energized to step the switches. After energization to step the switches one place contacts 362' will open to deenergize coil 362 and then immediately close to cause another stepping operation. Hence the stepping switches will go from the number 9 to the number zero positions (it being understood that the fixed contacts of the stepping switches are acually of ring shape and the wipers rotate about the center of the ring so that the next position after the number 11 position is the zero position) step by step because of the alternate energization and deenergization of stepping coil 362. When the wiper of switch 386 reaches the zero position, the homing circuit to coil 362 will be broken and the stepping operation will cease, leaving the stepping switches in their zero positions until another batching operation is started by operating start button 364.

Among the features of the control circuit is the provision of apparatus for preventing operation of the batcher until the control card is properly positioned in the card reader. It will be noted in FIG. 7 that the lower left hand corner of card 53 is cut away and that all the other corners are not cut away. On the left hand end of the card read-out relay circuit 54, shown in FIG. 2, it will be seen that a pair of relay coils 388 and 390 are provided. The movable contact of the card reader connected to coil 388 is positioned so that when the card is properly placed in the card reader the cut away corner will allow the movable contact to move against conductor 91 and energize coil 388. The movable contact for coil 390 is arranged in the card reader so that it engages the lower right hand corner of the card 53, when the card is properly placed in the card reader, so that coil 390 is not energized. The contacts of relay coils 388 and 390 are connected in series with coil 368 (FIG. 5). Contacts 388' are normally open contacts which are closed to render the control circuit effective only when coil 388 is energized. Contacts 390' are normally closed contacts and are open when coil 390 is energized. With this arrangement the entire batching system is held in an inoperative condition until the control card is properly positioned in the card reader. If, for example, the card was inserted in an upside down relationship, coil 388 would not be energized and contacts 388' would remain open. If the card was reversed in an end for end manner, coil 388 would not be energized and contacts 388' would remain open. Obviously, for any other incorrect positioning of the card the system will be held inoperative. In the absence of any card, coil 390 would be energized and contacts 390' are held open to prevent operation of the batching system.

The zero balance meter 60 (FIGS. 1 and 6) is arranged to measure the magnitude and phase of any signal voltage that results from an unbalance of voltages between the load cells 22, zero balance circuit 42 and pre-set voltage circuit 44. The zero balance detector visually indicates any unbalance voltage. In operating the batching system the zero balancing circuit 42 (FIGURES 1 and 3) must first be adjusted so that the output voltage of the load cells as modified by the zero balancing circuit is zero when no load is in the weighing hopper. In order to make this adjustment it is only necessary to watch zero meter 60 and adjust potentiometer 278 in the zero balancing circuit until the meter reads zero when no load is in the hopper and the stepping switches are in their zero positions, so that none of the pre-set voltage circuits are producing an opposing voltage.

*Operation*

It will be assumed that control card 53 has been punched in accordance with the example hereinbefore explained, i.e. 21.6, 79.8, 1.3 and 56.4 lbs. of ingredients #1 #2, #3 and #4, respectively, and it will be further assumed that the numbers 1 and 2 in the dribble column of the card have been punched as indicated by the circles on FIG. 7. It is further assumed that the circuit is arranged so that one pound is delivered at the dribble rate when both number 1 and number 2 are punched in the dribble column. When the card is dropped into card reader 52 and the card hold button 338 (FIG. 2A) is pushed, relay coil 340 will be energized to move all of the card reader movable contacts at the top of FIG. 2 against or through the control card. If the card is properly inserted in the card reader, the card position determining relay coils 388 and 390 will be operated to prepare coil 368 for energization (FIG. 5). At the same time all of the movable contacts of the card read out relay banks 62, 64, 66 and 68 (FIG. 2) will cause the appropriate relays to be conditioned for energization. In relay bank 62, which is for the #1 ingredient, only coils 72, 82, 86, and 88 will be conditioned for energization to represent 21.6 lbs. In relay bank 64, only coils 92, 94, 96, 98, 104 and 106 are conditioned for energization to represent 79.8 lbs. of #2 ingredient. In a similar manner the relays in circuits 66 and 68 are conditioned to represent 1.3 and 56.4 lbs. of #3 and #4 ingredients respectively. Since the stepping switches are all in their zero or rest positions, none of the card read out relays will be energized and the batching system stays in this condition until start button 364 (FIG. 5) is closed. Also the dribble relays 310 and 312 are both prepared for energization by reason of the fact that the numbers 1 and 2 are punched out of the dribble column of the card, but the relays are not actually energized because the stepping switches are in their zero positions.

While the stepping switches are in their zero positions the zero balancing circuit 42 is adjusted until the zero meter 60 reads zero, indicating that any load cell voltage due to dead weight or a tare weight has been balanced out. In ordinary operation the zero balance adjustment will need to be made only occasionally.

To start the batching operation start button 364 (FIG. 5) is momentarily pressed and completes an obvious energizing circuit for relay 366. Relay 366 operates and at its contacts 366′ completes an operating circuit for stepping relay control relay 368, which circuit extends from one side of rectifier 354, over conductor 356, contacts 390′, contacts 388′, contacts 366′, normally closed contacts of stop button 370, the winding of coil 368 and conductor 358 to the other side of rectifier 354. Relay 368 is energized and at its contacts 368′ completes an energizing circuit for stepping relay 362 extending from the output of rectifier 354, over conductor 356, contact "0" of switch 372, contacts 368′, conductor 371, the winding of relay 362 and conductor 358 to the other side of rectifier 354. Relay 368 at its contacts 368″ prepares its own holding circuit which extends from one side of rectifier 354, over conductor 356, contacts 1–11 of switch 372, contacts 368″, normally closed contacts of stop switch 370, the winding of relay 368, and conductor 358 to the other side of rectifier 354. Stepping relay 362 operates and advances the stepping switches to their number 1 positions. Upon reaching the number 1 positions, the operation of each stepping switch is placed under control of the balance detector, and the switches will stay in their number 1 positions until a balance of voltages is created. In the number 1 position of stepping switch 298 (FIG. 2) the relays that were conditioned for energization in relay bank 62 have a circuit completed thereto by means of switch 298. Thus in example used for illustration, coils 72, 82, 86 and 88 are energized. The contacts for these relays in pre-set voltage circuit 154 (FIG. 3) are closed to render effective resistors 164, 174, 178 and 180. The joint effect of the resistors is to produce a voltage drop across network 192, which is exactly equal to the load cell voltage that would be produced by a weight of 21.6 lbs. in the hopper. At the same time stepping switch 360 (FIG. 5), in its number 1 position, completes an energizing circuit for the main feed valve solenoid 24 for the #1 ingredient, which circuit extends from a source of A.C. voltage, over conductor 350, contacts 376‴, the winding of solenoid 24, contacts #1 of switch 360 and conductor 352 to the source of A.C. voltage. Solenoid 24 operates and opens the feed valve for the #1 ingredient. Hence, the #1 ingredient will be delivered to the load cell supported weighing hopper 20 (FIG. 1). In the number 1 position of stepping switch 324 (upper right corner of FIG. 2) dribble relay 312 will be energized. Contacts 312′ in the dribble voltage circuit 314 (FIG. 4) are thereby closed to render effective resistor 322, which produces a voltage drop across resistor 320 that is equal to the load cell voltage produced by one pound of weight in the hopper.

With the above described condition of the batching system, as ingredient #1 is being delivered to the hopper, it should be noted that the voltage produced by pre-set voltage circuit 154 (and this is the only effective pre-set voltage circuit) is in phase opposition to the increasing load cell voltage and the dribble voltage is in phase with the increasing load cell voltage. Thus, the opposing voltage will be greater than the combined laod cell and dribble voltages until 20.6 pounds of #1 ingredient are delivered to the hopper, i.e. 21.6 lbs. less 1 lb. to be delivered at the dribble rate. When 20.6 pounds are in the hopper, the balance detector 50 (FIGS. 1 and 6) detects the voltage balance and causes balance detector contacts 382′ to interrupt the energizing circuit for relay 380. Relay 380 is deenergized and at its contacts 380′ completes the energizing circuit for relay 376. Relay 376 is operated and at its contacts 376′ completes the operating circuit for relay 362.

Relay 376 at its contacts 376‴ interrupts the energizing circuit for the #1 ingredient main feed valve solenoid 24 and stops the feed from the main valve. Relay 362 operates and advances the wipers of the step switches to their #2 positions.

In its number 2 position stepping switch 360 (FIG. 5) further interrupts the energizing circuit for the #1 ingredient main feed valve solenoid 24. The #1 ingredient dribble feed valve solenoid 26 is energized to start dribble feed of the #1 ingredient. Stepping switch 298 (upper left hand corner of FIG. 2) for the #1 ingredient card read-out relay circuit in its number 2 position still retains the same relays energized, but the other card read-out relays for the other ingredients are not yet energized. In its number 2 position, stepping switch 324 (upper right hand corner of FIG. 2) disconnects the dribble coil 312 from the circuit to deenergize it. Since coil 312 is deenergized, the dribble voltage that appeared across resistor 320 in dribble voltage circuit 314 (FIG. 4) is reduced to zero. Thus in the voltage balancing part of the circuit an unbalanced condition to the extent of 1 lb. exists, i.e. the load cell voltage represents 20.6 lbs., the opposing voltage of the #1 ingredient pre-set voltage circuit 154 represents 21.6 lbs. and the dribble voltage is zero. Since an unbalance exists, the balance detector contacts 382′ are closed to prepare the stepping circuit for operation when another balance of voltages occurs. Hence, ingredient #1 dribbles into the hopper until exactly 21.6 lbs. is present, and at this time a balanced voltage condition exists between the load cell voltage and the opposing voltage of pre-set voltage circuit 154. Upon sensing the balance of voltages by balance detector 50, contacts 382′ open to cause the stepping coil to be energized and step all of the switches to their number 3 positions.

In its #3 position stepping switch 360 (FIG. 5) energizes the main valve 28 to cause feed of the #2 ingredient, switch 304 completes the energization of any card read-out relays of bank 64 which were conditioned for energization by the control card and switch 324 again energizes dribble relay coil 312. Thus, in the pre-set voltage circuit 156 of FIG. 3 an opposing voltage is produced across network 262 representative of 79.8 lbs., and in the dribble voltage circuit 314 of FIG. 4 a voltage will be produced across resistor 320 representative of 1 lb. It should be noted that the #1 ingredient card read-out relays remain energized when stepping switch 298 assumes its number 3 position so that the pre-set voltage of circuit 154 (FIG. 3) remains effective. Thus, an unbalance of voltages initially exists because the load cell voltage is equal to 21.6 lbs., the total opposing voltage is equal to 21.6 lbs. for ingredient #1 plus 79.8 lbs. for ingredient #2, and 1 lb. is represented by the dribble voltage.

The #2 ingredient will be delivered to the weighing hopper until 78.8 lbs. is in the hopper at which time a balanced voltage condition prevails, since the load cell voltage of 100.4 lbs. (21.6+78.8) plus the dribble voltage of 1 lb. equals the total opposing voltage of 21.6 lbs. plus 79.8 lbs. Upon opening of balance detector contacts 382′ (FIG. 5) due to this voltage balance, the stepping coil 362 will be energized to step the switches to their number 4 positions. In their number 4 positions the stepping switches further interrupt the energizing circuit for solenoid 28 which has closed because of the operation of contacts 376‴. A circuit is completed to start the #2 ingredient dribble feed, and render the dribble voltage circuit ineffective in producing a dribble voltage. After the one pound of ingredient #2 has dribbled into the weighing hopper a voltage balance is again created, and the balance detector 50 through its contacts causes the stepping switches to move to their number 5 positions. In the same manner described above, the required weight of 1.3 lbs. of ingredient #3 will be delivered to the hopper, .3 lb. being delivered at the main feed rate and 1 lb. being delivered at a dribble rate in positions 5 and 6, respectively, of the stepping switches. In positions 7 and 8, 56.4 lbs. of the #4 ingredient is delivered to the hopper at a fast and dribble rate.

When the voltage balance condition is reached with the stepping switches in their number 8 position to indicate that all 56.4 lbs. of the #4 ingredient are in the weighing hopper, the balance detector causes the switches to be stepped to their number 9 positions. In this position stepping switch 360 (FIG. 5) completes an operating circuit for relay coil 384 to actuate relay contacts 384' and complete a homing circuit through stepping switch 386. By means of the homing circuit, stepping coil 362 will be pulsed until the switches all return to their zero positions. The automatic operation of the batcher then ceases and the switches come to rest in these positions until another operation is started.

The control card is released from the card reader preparatory to inserting another card by closing card release switch 344, which energizes a catch solenoid 342 and allows the movable contacts of the card reader to return to a position out of engagement with the card. At the same time, relay coil 346 is energized to close contacts 346' and energize solenoid 348, which then allows the control card to fall from the card reader. As the card release switch 344 is no longer held closed, the solenoid 348 again deenergizes after time delay so that the next card inserted in the card reader will not fall through but be positioned for operation. As herein illustrated coil 346 is shunted by a condenser to provide a time delay characteristic in its operation. This condenser may be eliminated, if a relay having an inherent time delay characteristic is employed.

In summary, the present invention is directed toward a batch weighing system in which desired amounts of a plurality of ingredients are sequentially combined in a hopper in accordance with informaiton punched into a card. An accurate control over the weighing operation is achieved by using a slow or dribble feed for introducing an incremental amount of each ingredient following a fast or coarse feed. The batching operation is completely automatic after its initial start and requires no personal supervision thereafter. A simplified numerical system for indicating the desired weight of each ingredient is utilized to combine the simplicity of the binary numerical system with the more familiar decimal numerical system.

While only one embodiment of the invention has been described, it should be understood that various mechanical equivalents may be used and various modifications made without departing from the scope of the invention as defined in the appended claims.

We claim:

1. In a weighing system of the type utilizing a control card having weight information impressed thereon, said weight information representing a certain amount of material, a weighing hopper, means for feeding material to said hopper, means for producing a first voltage representative of the weight of material in said hopper, means to sense the weight information impressed on said card and produce a second voltage in accordance with said weight information, and means responsive to said voltages to stop material feed after said certain amount of material is fed to the hopper.

2. In a batch weighing system of the type utilizing a control card having impressions thereon to represent a certain weight of material, means for receiving material to be weighed, means for delivering material to said receiving means, means for producing a first voltage proportional to the weight of material carried by said receiving means, circuit means for producing a pre-set voltage, a plurality of means in said circuit means operative to determine the magnitude of said pre-set voltage, and electrical means to operate certain of said plurality of means in said circuit means in accordance with the impressions on said card.

3. In a batch weighing system of the type utilizing a control card having information thereon to represent a predetermined weight of material, means for receiving material to be weighed, means for delivering material to said receiving means, means for producing a first voltage proportional to the weight of material carried by said receiving means, circuit means for producing a second voltage in phase opposition to said first voltage, a plurality of means in said circuit means operative to select the magnitude of said second voltage, electrical means to operate certain of said plurality of means in said circuit means in accordance with the weight information impressed on said card, and means to measure said voltages and stop delivery of material to said receiving means after said predetermined weight is delivered to said receiving means.

4. In a batch weighing system of the type utilizing a control card having information thereon to represent a predetermined weight of material, means for receiving material to be weighed, means for delivering material to said receiving means, means for producing a first voltage proportional to the weight of material carried by said receiving means, circuit means for producing a second voltage in phase opposition to said first voltage, a plurality of means in said circuit means operative to select the magnitude of said second voltage, electrical means to operate certain of said plurality of means in said circuit means in accordance with the weight information impressed on said card, and means for sensing the difference in voltage between said first and second voltages and operative in response to a voltage balance condition to actuate said delivery means and stop material delivery to said receiving means.

5. In a batch weighing system of the type utilizing a control card having information thereon to represent a predetermined weight of material, means for receiving material to be weighed, means for delivering material to said receiving means, means for producing a first voltage proportional to the weight of material carried by said receiving means, circuit means for producing a second voltage in phase opposition to said first voltage proportional to the value of said first voltage corresponding to a predetermined weight of material in said receiving means, a plurality of means in said circuit means operative to control the magnitude of said second voltage, and a card reader arranged to sense the information on said card and operate said plurality of means in said circuit means to produce said second voltage having a value equal to the value of said first voltage produced by said predetermined weight of material in said receiving means.

6. In a weighing system, a weighing hopper, means for feeding material to said hopper, means producing a first voltage representative of the weight of material in said hopper, a control card having numerical information thereon in binary coded decimal form, certain of said binary coded decimal numbers being denoted on said card to select the weight of material to be delivered to said hopper, means to sense the denoted binary coded decimal numbers and produce a second voltage in accordance therewith, and means responsive to said voltages to stop material feed after the selected weight of material has been delivered to said hopper.

7. In a batch weighing system, means for receiving material to be weighed, means for delivering material to said receiving means, means for producing a first voltage proportional to the weight of material carried by said receiving means, circuit means for producing a pre-set voltage, a plurality of means in said circuit means operative to determine the magnitude of said pre-set voltage, a control card having binary coded decimal numerical notations thereon, certain of said binary coded decimal notations being denoted to select the weight of material to be delivered to said receiving means, and electrical means to operate certain of said plurality of means as determined by the denoted binary coded decimal notations on said control card whereby said circuit means produces a pre-set voltage representative of the material weight selected on said card.

8. In a batch weighing system, means for receiving material to be weighed, means for delivering material to said receiving means, means for producing a first voltage proportional to the weight of material carried by said receiving means, circuit means for producing a second voltage in phase opposition to said first voltage, a plurality of means in said circuit means operative to select the magnitude of said second voltage, a control card having binary coded decimal numbers thereon, certain of said numbers being denoted to select a predetermined weight of material to be delivered to said receiving means, electrical means to operate certain of said plurality of means in said circuit in accordance with the denoted numbers on said card, and means to measure said voltages and stop delivery of material after said predetermined weight is delivered to said receiving means.

9. In a batch weighing system, means for receiving material to be weighed, means for delivering material to said receiving means, means for producing a first voltage proportional to the weight of material carried by said receiving means, a voltage producing circuit for producing a second voltage, a plurality of impedance elements selectively operable in said voltage producing circuit, the magnitude of said second voltage being dependent upon which of said impedance elements are rendered operable, a control card having impressions thereon to represent a predetermined weight of material to be delivered to said receiving means, and a card reader adapted to sense the impressions on said card and render certain of said impedance elements operable to produce a second voltage representative of said predetermined weight of material.

10. In a batch weighing system, means for receiving material to be weighed, means for delivering material to said receiving means, means for producing a first voltage proportional to the weight of material carried by said receiving means, a voltage producing circuit for producing a second voltage, a plurality of impedance elements selectively operable in said voltage producing circuit, the magnitude of said second voltage being dependent upon which of said impedance elements are rendered operable, a control card having numerical information thereon in binary coded decimal form, certain of said binary coded decimal numbers being denoted on said card to select a predetermined weight of material to be delivered to said receiving means, each of said impedance elements being arranged to produce a voltage representative of a weight expressed in binary coded decimal notation, and a card reader adapted to detect the denoted binary decimal numbers and render operative the impedance elements which produce voltages that correspond to the denoted binary coded decimal numbers.

11. In a batch weighing system, a weighing hopper, first and second valve means to control delivery of first and second ingredients to said hopper, means producing a first electrical output proportional to the weight of ingredients in said hopper, first and second pre-set electrical output circuits for producing first and second pre-set electrical outputs, an information media having data information thereon to represent the pre-selected weight of the first ingredient and pre-selected weight of the second ingredient to be delivered to said hopper, a data reading means arranged to sense the data on said information media and condition said first and second pre-set electrical output circuits to produce a first pre-set electrical output proportional to the pre-selected weight of the first ingredient and produce a second pre-set electrical output proportional to the pre-selected weight of the second ingredient, and a sequence control circuit to initially connect said first pre-set electrical output in circuit with said first electrical output and then connect said second pre-set electrical output in circuit with said first electrical output.

12. In a batch weighing system, a weighing hopper, first and second valve means to control delivery of first and second ingredients to said hopper, means producing a first voltage proportional to the weight of ingredients in said hopper, first and second pre-set voltage circuits for producing first and second pre-set voltages, a control card having impressions thereon to represent the pre-selected weight of the first ingredient and pre-selected weight of the second ingredient to be delivered to said hopper, a card reader arranged to sense the impressions on said card and condition said first and second pre-set voltage circuits to produce a first pre-set voltage proportional to the pre-selected weight of the first ingredient and produce a second pre-set voltage proportional to the pre-selected weight of the second ingredient, a sequence control circuit to initially connect said first pre-set voltage in phase opposition to said first voltage and then connect said second pre-set voltage in circuit with said first voltage, and a balance detector in said sequence control circuit arranged to sense a balance of voltages between said first voltage and said first pre-set voltage and cause the second pre-set voltage to be connected in circuit with said first voltage.

13. In a batch weighing system, means for receiving material to be weighed, means for delivering material to said receiving means, means for producing a first voltage proportional to the weight of material carried by said receiving means, circuit means for producing a pre-set voltage, a plurality of means in said circuit means operative to determine the magnitude of said pre-set voltage, a control card having impressions thereon to represent the weight of material to be delivered to said receiving means and electrical means to operate certain of said plurality of means in said circuit means in accordance with the impressions on said card, circuit means for producing a dribble voltage, a plurality of electrical means in said dribble voltage producing circuit operative to determine the magnitude of said dribble voltage, said control card having other impressions thereon to represent the weight of material to be delivered to said receiving means at a dribble rate, and card reader means to operate certain of said electrical means in said dribble voltage producing circuit in accordance with said other impressions on said card.

14. In a weighing system, a weighing hopper, means for feeding material to said hopper, means for producing a first voltage representative of the weight of material in said hopper, a control card having weight information impressed thereon, said weight information representing a certain amount of material, means to sense the weight information impressed on said card and produce a second voltage in accordance with said weight information, said feeding means including apparatus for effecting a fast and slow feed of said material, said card also having other information impressed thereon to represent the amount of the material to be delivered to the hopper at the slow feed, means to sense said other information impressed on said card and produce a dribble voltage in accordance with the amount of material to be delivered at the slow feed.

15. In a weighing system, means for receiving material to be weighed, means for delivering material to said receiving means, means for producing a first electrical output proportional to the weight of material carried by said receiving means, circuit means for producing a second electrical output the magnitude of which is proportional to the magnitude of said first electrical output produced by a predetermined weight of material in said receiving means, a plurality of electrical elements in said circuit means, each of said elements being effective to develop a certain representative electrical output, said second electrical output being the resultant electrical output produced by combining said representative electrical outputs, means to render the required electrical elements effective to develop a second electrical output proportional to said predetermined weight value, and means to stop material delivery when said first electrical output equals said second electrical output.

16. In a weighing system means for receiving material to be weighed, means for delivering material to said receiving means, means for producing a first voltage proportional to the weight of material carried by said receiving means, circuit means for producing a second voltage the magnitude of which is proportional to the magnitude of said first voltage produced by a predetermined weight of material in said receiving means, a plurality of impedance elements in said circuit means each of said elements being effective to produce a voltage representative of a weight expressed in binary notation, said second voltage being the resultant voltage produced by combining the voltages that represent binary weight values, means to render appropriate impedance elements effective so as to produce a second voltage representative of said predetermined weight of material, and means to stop material delivery when said first voltage equals said second voltage.

17. In a weighing system, means for receiving material to be weighed, means for delivering material to said receiving means, means for producing a first voltage proportional to the weight of material carried by said receiving means, circuit means for producing a second voltage the magnitude of which is proportional to the magnitude of said first voltage produced by a predetermined weight of material in said receiving means, a plurality of impedance elements in said circuit means each of said elements being effective to produce a voltage representative of a weight expressed in binary coded decimal notation, said second voltage being the resultant voltage produced by combining the voltages that represent binary coded decimal weight values, means to render appropriate impedance elements effective so as to produce a second voltage representative of said predetermined weight of material, and means to stop material delivery when said first voltage equals said second voltage.

18. In a system for measuring into a hopper a predetermined weight of a material, a pre-set voltage circuit producing a first voltage the magnitude of which controls the weight of material delivered into the hopper, valve means controlling the flow of material into said hopper, load cell means for producing a second voltage proportional to the weight of material introduced into said hopper through said valve means, a plurality of impedance elements in said pre-set voltage circuit, each of said impedance means being effective to produce a part of said first voltage, means selectively to render appropriate impedance elements effective whereby the magnitude of said first voltage is established to represent said predetermined weight of material in said hopper.

19. In a system for measuring into a hopper a predetermined weight of a material, a pre-set electrical circuit provides a first electrical output which controls the amount of weight of material delivered into the hopper, valve means controlling the flow of material into said hopper, weight sensing means for producing a second electrical output proportional to the weight of material in said hopper, a plurality of impedance elements in said pre-set circuit, each of said impedance elements being effective to produce a part of said first electrical output and the impedance value of each of said impedance elements being such that the part of said first electrical output produced thereby is representative of a binary numerical part of said first electrical output and means to render said impedance element effective in their electrical output producing function.

20. In a system for measuring into a hopper a predetermined weight of a material, a pre-set voltage circuit producing a first voltage the magnitude of which controls the weight of material delivered into the hopper, valve means controlling the flow of material into said hopper, load cell means producing a second voltage proportional to the weight of material in said hopper, a plurality of impedance elements in said pre-set voltage circuit, each of said impedance elements being effective to produce a part of said first voltage and the impedance value of each of said impedance elements being such that the part of said first voltage produced thereby is representative of a binary coded decimal numerical part of said first voltage, and means to render said impedance means effective in their voltage producing function.

21. In a batch weighing system, a weighing hopper, valve means for controlling delivery of material to said hopper, load cell means producing a voltage proportional to the weight of material in said hopper, a pre-set voltage circuit adapted to produce an adjustable control voltage in opposition to the load cell voltage, a control card for selecting the magnitude of said control voltage, said card being impressed with weight information, and a card reader arranged to determine the impressed weight information on said card and establish a corresponding magnitude of said control voltage.

22. The weighing system defined in claim 21 and further including, a plurality of relays in said card reader, certain of said relays being energized in accordance with the weight information impressed on said card, and means operated by said relays to produce a control voltage the magnitude of which corresponds to said weight information.

23. The weighing system defined in claim 21 and further including, a plurality of resistances in said pre-set voltage circuit, each of said resistances being energizable to produce a voltage, said control voltage being the summation of the voltages created by the energized resistances, and means in said card reader to energize appropriate resistances in accordance with the weight information impressed on said card to produce a control voltage the magnitude of which represents the impressed weight information.

24. The weighing system defined in claim 21 and further including, a plurality of relays in said card reader, certain of said relays being energized in accordance with the weight information impressed on said card, a plurality of resistances in said pre-set voltage circuit, each of said resistances being energizable to produce a voltage, said control voltage being the summation of the voltages created by the energized resistances, a relay contact for each of said relays in circuit with one of said resistances, whereby, energization of the relays causes energization of the corresponding resistances.

25. In a batch weighing system, a weighing hopper, valve means for controlling delivery of material to said hopper, load cell means producing a voltage proportional to the weight of material in said hopper, a pre-set voltage circuit adapted to produce an adjustable control voltage to the load cell voltage, a control card for selecting the magnitude of said control voltage, said card being impressed with weight information, a card reader arranged to determine the impressed weight information on said card and establish a corresponding magnitude of said control voltage, card interlock means operated from said card to sense whether said card is correctly oriented in said card reader, and a control circuit to hold the weighing system inoperative until said card interlock means senses the correct orienting of said card.

26. In a batch weigher, a hopper for receiving the several ingredients of a batch, load cell means producing a voltage proportional to the weight of the ingredients in said hopper, plurality of valves individually operable for controlling the delivery of each ingredient to said hopper, a plurality of pre-set voltage circuits each producing a control voltage proportional to a predetermined weight of an ingredient, a control card having information impressed thereon to denote the predetermined weights for each ingredient, and a card reader arranged to establish a control voltage in each pre-set voltage circuit that corresponds to the weight information impressed on said card for each ingredient.

27. In a batch weigher, a hopper for receiving the several ingredients of a batch, load cell means producing a voltage proportional to the weight of the ingredients in said hopper, plurality of valves individually operable for controlling the delivery of each ingredient to said hopper, a plurality of pre-set voltage circuits each producing a control voltage proportional to a predetermined weight of an ingredient, a control card having information impressed thereon to denote the predetermined weights for each ingredient, and a card reader arranged to establish a control voltage in each pre-set voltage circuit that corresponds to the weight information impressed on said card for each ingredient, circuit means for sequentially connecting said control voltages in circuit with said load cell voltage and sequentially opening the ingredient delivering valves, and a balance detector to sense a balanced voltage condition between said load cell voltage and the effective control voltages, said balance detector serving to operate said circuit means to connect another of said control voltages in circuit with said load cell voltage after a voltage balance condition has prevailed.

28. A material weighing apparatus comprising means for detecting data on an information media which data indicates quantities of material to be weighed, a weight indicating means, for delivery of selective materials to said weight indicating means, means operable by said indicating means for producing an electrical output indicative of weight, means responsive to said means for detecting data for producing an electrical quantity representative of an individual material to be weighed, means for comparing said electrical quantity with said electrical output, and means responsive to said comparison for signalling said delivery means to cease delivery of material being weighed.

29. A material weighing apparatus comprising means for detecting data on an information media which data indicates quantities of material to be weighed, a weight indicating means, means for delivery of selected materials to said weight indicating means, means for producing an electrical output indicative of the weight of the delivered material, means responsive to said data for producing an electrical quantity representative of the material to be weighed, and means responsive to said electrical quantity and said electrical output for controlling the operation of said delivery means.

30. A material weighing apparatus comprising, in combination, means for detecting data on an information media which data indicated quantities of material to be weighed, a weight indicating means, means for delivery of selected materials to said weight indicating means, means for producing an electrical output indicative of the weight of the delivered material, means responsive to said data for producing an electrical quantity representative of the material to be weighed, means for comparing said electrical quantity with said electrical output, and means responsive to said comparison for controlling the operation of said delivery means.

31. A material weighing apparatus comprising means for detecting data on an information media which data indicates quantities of material to be weighed, weight indicating means, means for delivery of selected materials to said weight indicating means, means responsive to said data for actuating said delivery means to deliver material to said weight indicating means, means responsive to said data for producing an electrical quantity representative of the material to be weighed, means for producing an electrical output indicative of the weight of the delivered material, means for comparing said electrical quantity with said electrical output, and means responsive to said comparison for selectively signalling said delivery means to cease delivery of the material being weighed.

32. In a weighing system of the type utilizing information media having weight information, said weight information representing a certain amount of material, a weighing means, means for feeding material to said weighing means, means for producing a first signal representative of the weight of material in said weighing means, means to sense said weight information and produce a second signal in accordance therewith, and means responsive to said first and second signals to stop material feed after said certain amount of material is fed to said weighing means.

33. In a batch weighing system, a weight indicating means, means for delivery of selected materials to said weight indicating means, means for producing a first signal proportional to the weight of material carried by said weight indicating means, circuit means for producing a pre-set signal, information media having a first group of data representing the weight of material to be delivered to said receiving means, means for producing a first electrical quantity representative of said first group of data, means for comparing said first signal and said first electrical quantity for signalling said delivery means to cease delivery of material being weighed, fine control circuit means for producing a dribble feed signal, said information media having a second group of data representing the weight of material to be delivered to said receiving means at a dribble rate, means for producing a second electrical quantity of said second group of data, and means for operating said fine control circuit means in accordance with said second group of data to deliver a pre-selected amount of material at a dribble rate.

References Cited by the Examiner

UNITED STATES PATENTS

| | | | |
|---|---|---|---|
| 2,318,591 | 5/43 | Couffignal | 235—61 |
| 2,353,002 | 7/44 | Armbruster | 235—91.14 |
| 2,431,058 | 11/47 | Manning | 249—14 X |
| 2,443,350 | 6/48 | Gilbert et al. | 249—43 |
| 2,534,801 | 12/50 | Siltamaki | 249—2 X |
| 2,625,300 | 1/53 | Saxe | 249—14 X |
| 2,650,790 | 9/53 | Carliss | 249—14 |
| 2,656,109 | 10/53 | Lindars | 249—14 X |
| 2,680,012 | 6/54 | Bozoian | 265—27 |
| 2,728,285 | 12/55 | Bradley et al. | 249—2 X |
| 2,733,911 | 2/56 | Thurston | 265—27 |
| 2,750,144 | 6/56 | Beckwith | 249—14 |
| 2,801,819 | 8/57 | Lindars | 249—14 X |

OTHER REFERENCES

Pages 80 and 82, April 16, 1955, "Business Week."

LEO SMILOW, *Primary Examiner.*

ISAAC LISANN, A. McFADYEN, C. A. CUTTING, *Examiners.*

UNITED STATES PATENT OFFICE
CERTIFICATE OF CORRECTION

Patent No. 3,173,504                                                     March 16, 1965

Matthew T. Thorsson et al.

It is hereby certified that error appears in the above numbered patent requiring correction and that the said Letters Patent should read as corrected below.

Column 7, line 69, for "is" read -- it --; column 8, lines 18 and 19, strike out "104 and 106 to close relay contacts 92′, 94′, 96′, 98′, dient causes energization of relay coils 92, 94, 96, 98," and insert instead -- dient cause energization of relay coils 92, 94, 96, 98, 104 and 106 to close relay contacts 92′, 94′, 96′, 98′, --; column 8, line 33, for "The" read -- These --; column 10, line 54, for "coil" read -- coils --; line 62, strike out "and"; column 12, line 55, for "times" read -- time --; column 15, line 71, for "laod" read -- load --; column 22, line 55, after "voltage" insert -- in opposition --; column 23, line 14, strike out "and"; line 29, before "for" insert -- means --.

Signed and sealed this 14th day of September 1965.

(SEAL)
Attest:

ERNEST W. SWIDER                                        EDWARD J. BRENNER
Attesting Officer                                      Commissioner of Patents